Sept. 5, 1933.  H. H. STYLL  1,925,575
OPHTHALMIC LENS
Filed Feb. 25, 1929
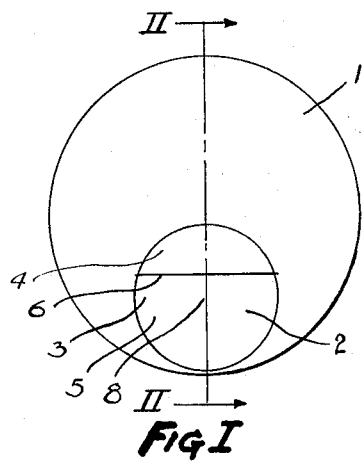
FIG I
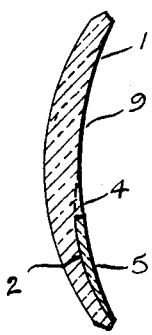
FIG II
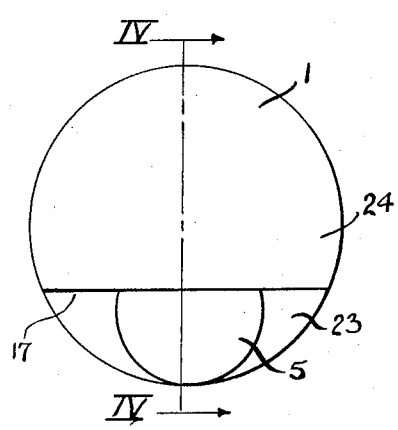
FIG III
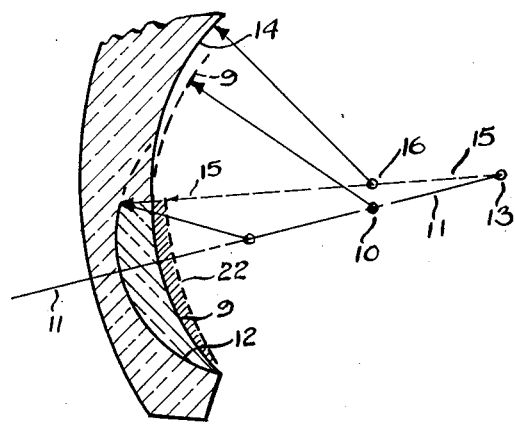
FIG IV
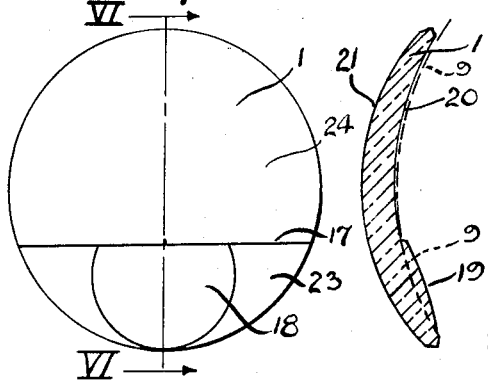
FIG V   FIG VI
Inventor
By Harry H. Styll
Attorney Patented Sept. 5, 1933

1,925,575

UNITED STATES PATENT OFFICE 1,925,575

OPHTHALMIC LENS

Harry H. Styll, Southbridge, Mass., assignor to American Optical Company, Southbridge, Mass., a voluntary association of Massachusetts Application February 25, 1929. Serial No. 342,533

6 Claims. (Cl. 88—54)

This invention relates to improvements in ophthalmic lenses and has particular reference to multifocal lenses composed of a plurality of sections of glass of different indices of refraction and to the process of making the same.

The principal object of this invention is to provide in a multifocal lens a distance field and a substantially straight top reading field with the passing point between these fields free from jump or displacement.

Another object of the invention is to provide a multifocal lens having a reading field which will not restrict the visual area of the eye when passing from one field to the other.

Another object of the invention is to provide a multifocal lens having two fields arranged at an angle to each other and a third field having a different index of refraction to the other two fields with the line of joinder of the first named fields between the center and edge of the third field on the vertical meridian.

Another object is to provide an improved process for making a multifocal lens of this character which will be simple, economical and efficient in production and operation.

Other objects and advantages will become apparent from the following description taken in connection with the accompanying drawing and it will be apparent that many changes may be made in the details of construction, arrangement of parts and steps of the process without departing from the spirit of the invention as expressed in the accompanying claims. I, therefore, do not wish to be limited to the exact details shown and described as the preferred forms only have been shown by way of illustration.

In the drawing:

Fig. I is a front view of a multifocal lens embodying the invention, at a certain stage of the process;

Fig. II is a section on line II—II of Fig. I;

Fig. III is a front view of the lens at the completion of the process;

Fig. IV is an enlarged sectional view on line IV—IV of Fig. III diagrammatically illustrating the features of the invention;

Fig. V is a front view of a modification;

Fig. VI is a section on line VI—VI of Fig. V.

It is well known that multifocal lenses have been made with a segment formed of a plurality of sections of glass fused together and then fused into a major blank. This type of lens has been popular because of the comparatively straight line which formed the line of joinder between the reading and distance fields. This straight line enabled a greater area to be covered when the eye passed from the distance into the reading field or vice versa, than in the case of the fully round segment. A line of type could be scanned at a glance directly the eye was lowered into the reading field and the wearer was not confined to a small semi-circular area as was the case at the upper portion of the round segment. However, the straight top line was subject to a serious drawback inasmuch as a jump or displacement of image took place at this point and destroyed the valuable features of this type of lens. In my invention I have provided a multifocal lens having a substantially straight top on the reading field and yet being truly monaxial or free from jump or displacement of image at this point.

It is also well known that multifocal lenses have been made with monaxial properties but these have also been subject to certain drawbacks. Among the worst of these may be enumerated the fact that when a straight top reading segment was desired the segment was placed with its center directly coincident with the optical center of the major lens with the straight top passing through this point and thus the position was always fixed and immovable. Any lowering of the segment necessitated a wastage of glass and much labor.

Another defect was the thick edge which was apparent when the segment was divided on its center which was the thickest part of the segment. In my invention the segment is divided at a point remote from the center and therefore leaves a thin edge which is barely apparent after fusing into the major blank.

It will be seen that I have eliminated the major defects and made it unnecessary to place the center of the segment and, therefore, the straight top in the optical center of the major lens. I have also provided means to obtain a plurality of fields of various powers if desired without departing from the simple and inexpensive process employed to manufacture the ordinary two field lens.

Referring to the drawing wherein similar reference characters denote corresponding parts throughout, the numeral 1 designates the major portion of the multifocal lens which is provided with a minor insert 2. The first step in the process of making the improved lens is to form the major blank 1 either meniscus as shown in Fig. II or flat. A depression 3 preferably of spherical shape is next formed by grinding or other suitable means in one face of the major blank as shown in Fig. I and polished to an optical finish. The minor insert 2 is preferably next made by forming a portion 4 of glass having optical properties corresponding to those of the major blank 1. Crown glass may be used for both major blank 1 and portion 4. As shown in Fig. II, the portion 4 is shaped to a segment of a circle having a straight lower edge 6 and is adapted to fit into the depression 3 in the major blank 1. Another minor portion 5 is next made to segmental shape and when placed edge to edge with portion 4 will form the complete insert 2 and fill the depression 3 in the major blank 1. The minor portion 5 is preferably formed of flint glass or glass having a different refractive index to that of the major blank 1.

As a means of avoiding excessive chromatic aberration in the finished lens, I can use glasses having different refractive indices but similar reciprocal relative dispersions fused together to form the complete segment 2.

The portion 5 and the portion 4 are next placed with the edge 6 contacting and fused together to form a complete insert 2. It will be noted that the center 8 of the fused insert 2 is substantially below the line 6 of the segment. This construction is for a purpose to be described later.

The fused segment 2 is then placed in the depression 3 in the lens blank 1 and the whole assembly subjected to heat. At a certain temperature the upper portion 4 of the segment will soften and become invisibly mingled with the glass forming the major portion 1. The lower portion 5 is left intact but fused to the major blank 1. The upper line 6 is left as the line of joinder between the distance and reading fields. After the segment has been fused in the major blank 1, I grind a continuous curve 9 over both major and minor portions. It will be noted that the concave side has been described as the side to affix the minor portion 2, but either side can be used with equal facility. The lens is now in a condition to be made monaxial and by referring to Fig. IV it will be seen how this is accomplished. The center 10 is the center of curvature of the continuous curve 9 and lies on the line 11—11 passing through the center 8 of the minor portion 2 and the center of the curvature of the depression 3.

I next determine the equivalent radius of the addition and the center of this equivalent curvature will lie on the line 11—11 at 13. This equivalent radius computed by the following method is the distance from point 13 to the curve 22, shown by dotted line 15—15.

If we assume that the glass used for the blank 1 is crown glass index of refraction 1.5 and also assume that the radius of the continuous curve 9 is minus 0.100 meters, then the surface power of the distance portion is:

$$\frac{1.5 \text{ minus } 1.0}{\text{minus } 0.100} \text{ equals minus 5 diopters}$$

If we assume that the power of the minor portion 5 is required to be two diopters, then the equivalent surface 22 has a power of minus 5 diopters plus 2 diopters which equals minus 3 diopters. The radius of this surface 22 or line 15—15 is, therefore:

$$\frac{1.5 \text{ minus } 1.0}{\text{minus } 3} \text{ which equals minus 0.167 meters.}$$

The surface 12 to give the required power to segment 5 of plus 2 diopters depends upon the index of refraction of this portion 5 and can be obtained by the usual prior art methods for fused bifocals.

I next grind and polish a second curvature 14, the curvature of which is the same as 9, and the center 16 upon line 15—15. The blank now has curvature 9 upon the lower part and curvature 14 upon the upper and the line of joinder between the two will be a straight line 17, Fig. III. The powers of the upper field 24 and the lower field 23 will be equal. This will conform to all the requirements of a monaxial lens and be of the multifocal type having two fields and a substantially straight top segment. I can also make the line 17 of a down curving type and thereby obtain a three field monaxial lens. In this type the upper field would be of intermediate power between the reading addition and the lower field. I can also make the line 17 of an up curving type and again alter the relative powers of my three fields. In the latter case the power of the minor or reading portion 5 will be the highest plus power; the lower field 23 will be next, and the upper field 24 will be the lowest plus power. In both of the latter modifications it will be understood that I can make the line of joinder 6 of my segment of a curvature to coincide with the curvature of the line 17.

The prescription curve 21 may next be ground and polished on the opposite side of the blank to give the desired prescriptive power of the finished lens and the lens cut, shaped, drilled and bevelled to fit the desired type of mounting.

Another modification is shown in Figs. V and VI wherein is shown a one piece monaxial lens having a straight top reading field. This type of lens is of simple construction and eliminates all fusing operations. I first mold or otherwise shape a blank 1 to preferably meniscus form and in so doing I form a fully circular portion 18 rising from the concave side to form my reading field. This circular portion 18 is formed integral by the usual prior art methods while molding the blank 1. It will be noted that a straight top has been shown in Fig. V and this shape can also be so molded if desired. If a fully circular segment is formed the upper portion can be removed in the following manner whilst grinding the curvatures.

I next finish the concave side to a curvature 9 using the usual ring tool method and not touching the circular portion 18. I then finish the surface 19 of the segment to desired curvature and having computed the third curvature 20 as in the previous case I grind and polish this too, leaving a straight line 17 across the segment and major portion. The line 17 can be straight or curved upwardly or downwardly in a similar manner to the previously described case and a one piece monaxial lens having a straight top segment will result. This lens next has the prescription curve 21 ground and polished on the opposite side. It will be apparent that this lens also may have the reading portion 19 upon the convex side if desired. After I have cut, edged, bevelled and drilled this lens it is ready for fitting to the desired type of mounting.

Another method of forming this type of lens is to mold or otherwise shape a blank 1 to meniscus form leaving the circular portion 18 as before, rising from the concave side. Having finished the concave side to a curvature 9 using the ring tool method I cut along line 17 and divide the blank 1 into two pieces. I then make a portion 150 similar to the upper part 24 which I cut away but not having any raised portion 18 upon it. This I fuse edge to edge to the lower portion 23 and obtain the shape shown in Fig. V. It will be apparent that this lens also may have the raised portion upon the convex side if desired.

From the foregoing it will be seen that I have provided a multifocal lens having a substantially straight top reading field and being free from jump or displacement of image. The process of making this lens is of a simple, inexpensive kind and well adapted to be carried out in an economical and efficient manner with the present day types of tools and machines.

Having described my invention, I claim:

1. A multifocal lens comprising an upper single focal field and a lower multiple focal field, the upper field having the same index of refraction as the outer field of the lower portion and placed at an angle thereto, the inner field of the lower portion being of a different index of refraction from the said first two fields, and a continuation of the inner field of the lower portion into the upper field, said continuation being of the same index of refraction as the said upper field.

2. A multifocal lens comprising an upper single focal field and a lower multiple focal field, the upper field having the same index of refraction as the outer field of the lower portion and placed at an angle thereto, the inner field of the lower portion being of a different index of refraction from the said first two fields, and a continuation of the inner field of the lower portion into the upper field, said continuation being of a different index of refraction from the said inner field.

3. The process of forming a blank for a multifocal lens comprising securing a segment of glass having two portions of dissimilar index of refraction and a substantially straight line of joinder to a major blank of the same index of refraction as one portion of said segment, surfacing the segment and major portion to a common curvature, and finishing the surface extending from the substantially straight line of joinder to the upper edge of the major blank to a curvature to give a monaxial arrangement to the blank.

4. The process of forming a blank for a multifocal lens comprising securing a segment of glass having two portions of dissimilar index of refraction and a substantially straight line of joinder to a major blank of the same index of refraction as one portion of said segment, surfacing the segment and major portion to a common curvature and finishing off a portion of the major blank from the substantially straight line of joinder to the upper edge on the surfaced side to an optical surface monaxially arranged as respects the segment portion.

5. A multifocal or bifocal lens comprising an upper single focal field and a lower multiple focal field, the upper field having the same index of refraction as the outer field of the lower portion and placed at an angle thereto, the inner field of the lower portion being of a different index of refraction from the said first two fields, and a continuation of the inner field of the lower portion into the upper field, said continuation being of the same index of refraction as the said upper field, and a surface on the opposite side of said lens that will give the required prescriptive power of the finished lens.

6. A multifocal lens comprising an upper single focal field and a lower multiple focal field, the upper field having the same index of refraction as the outer field of the lower portion and placed at an angle thereto, the inner field of the lower portion being of a different index of refraction from the said first two fields, and a continuation of the inner field of the lower portion into the upper field, said continuation being of a different index of refraction from the said inner field, and a surface on the opposite side of said lens that will give the required prescriptive power of the finished lens.

HARRY H. STYLL.